United States Patent [19]

Ando et al.

[11] Patent Number: 5,473,014

[45] Date of Patent: Dec. 5, 1995

[54] RUBBER MODIFIED STYRENIC RESIN COMPOSITION HAVING HIGH GLOSS AND IMPACT STRENGTH

[75] Inventors: Toshihiko Ando; Mune Iwamoto; Masahiro Kaneko, all of Takaishi; Kouzou Ichikawa, Hadano; Akihiko Nakajima; Masato Takaku, both of Takaishi, all of Japan

[73] Assignee: Mitsui Toatsu Chemicals, Incorporated, Tokyo, Japan

[21] Appl. No.: 34,411

[22] Filed: Mar. 19, 1993

[30] Foreign Application Priority Data

Mar. 23, 1992 [JP] Japan .................................. 4-065051
Apr. 1, 1992 [JP] Japan .................................. 4-079712

[51] Int. Cl.$^6$ ........................... C08L 51/04; C08L 53/02
[52] U.S. Cl. ............................. 525/71; 525/88; 525/89; 525/98; 525/99; 525/316; 525/902
[58] Field of Search ......................... 525/89, 316, 314, 525/92, 98, 99, 70, 71, 53, 88, 243

[56] References Cited

U.S. PATENT DOCUMENTS

| | | | |
|---|---|---|---|
| 4,388,447 | 6/1983 | Iwamoto et al. | 525/316 |
| 4,493,922 | 1/1985 | Echte et al. | 525/71 |
| 4,587,294 | 5/1986 | Matsubara et al. | 525/53 |
| 4,839,418 | 6/1989 | Schwaban et al. | 525/53 |
| 5,180,780 | 1/1993 | Nakamura et al. | 525/96 |
| 5,210,132 | 5/1993 | Matsubara et al. | 525/316 |

FOREIGN PATENT DOCUMENTS

| | | |
|---|---|---|
| 196013 | 10/1986 | European Pat. Off. . |
| 390508 | 10/1990 | European Pat. Off. . |
| 429986 | 6/1991 | European Pat. Off. . |
| 2632235 | 2/1977 | Germany . |
| 59-001519 | 1/1984 | Japan . |
| 61-500497 | 3/1986 | Japan . |
| 63-048317 | 3/1988 | Japan . |
| 63-112646 | 5/1988 | Japan . |
| 63-241053 | 10/1988 | Japan . |
| 10-74209 | 3/1989 | Japan . |
| 1-261444 | 10/1989 | Japan . |
| 71-041467 | 7/1990 | Japan . |
| 73-018594 | 4/1992 | Japan . |

Primary Examiner—James J. Seidleck
Assistant Examiner—M. L. Warzel
Attorney, Agent, or Firm—Burns, Doane, Swecker & Mathis

[57] ABSTRACT

A rubber modified styrenic resin composition which can be obtained by dispersing rubber-like polymer particles in a homopolymer or a copolymer of a styrenic monomer. The rubber modified styrenic resin composition has:

(a) a volume-average particle size of the rubber-like polymer particles is in the range of from 0.2 to 0.8 μm, (b) a particle size distribution curve on the basis of the volume of the rubber-like polymer particles has one peak, (c) a ratio of a 5% value to a 95% value of the cumulative distribution of the particle size on the basis of the volume of the rubber-like polymer particles is in the range of from 3 to 45.

The rubber-like polymer particles comprise (i) a styrene-butadiene block copolymer (I), and (ii)(1) a styrene-butadiene block copolymer (II), (2) a polybutadiene (III), or (3) a styrene-butadiene block copolymer (IV) and polybutadiene (V), wherein (I) contains 25–50 % styrene, (II) and (IV) contain 5–20% styrene, the weight ratio of: (I)/(II), (I)/(III) and (I)/(IV) is from 95/5 to 40/60 and {(I)+(IV)}/(V) is from 99/1 to 70/30 and (I) to (V) are of specified styrene solution viscosity.

6 Claims, 1 Drawing Sheet

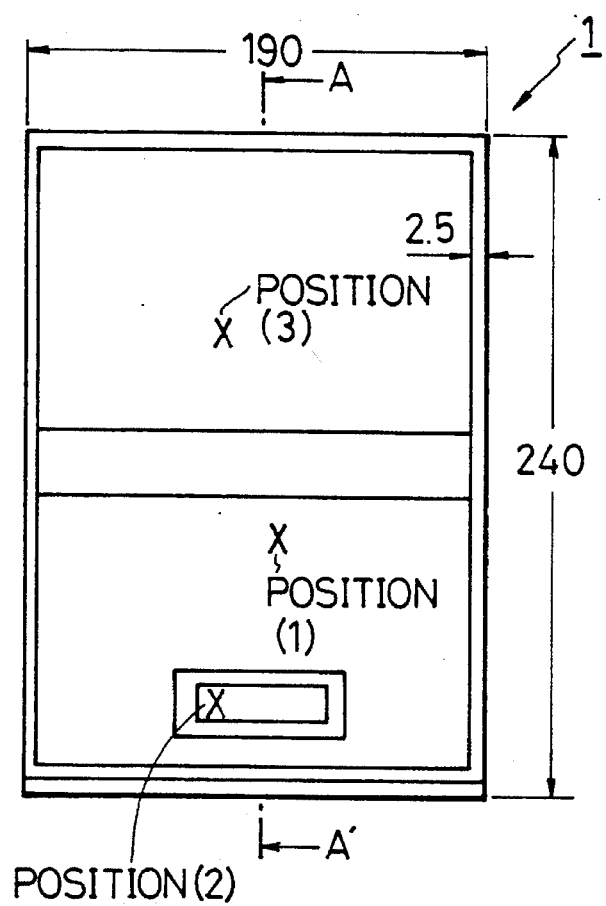 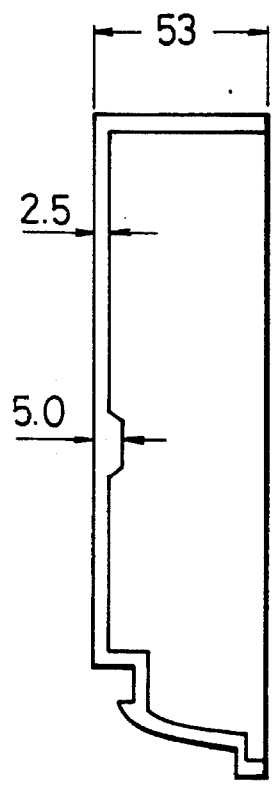
FIG.1(a)
FIG.1(b)
A-A' SECTIONAL VIEW
Unit : mm

RUBBER MODIFIED STYRENIC RESIN COMPOSITION HAVING HIGH GLOSS AND IMPACT STRENGTH

BACKGROUND OF THE INVENTION

1. Field of the Invention

The present invention relates to a rubber modified styrenic resin composition which is excellent in balance between the appearance and the impact strength of molded articles and which has high gloss, and it also relates to a method for preparing the same.

2. Description of the Related Art

Molded articles of ABS resins are excellent in balance between appearance and impact strength, and so they are widely used in domestic appliances, electronic equipments and the like. In recent years, a tendency toward the cost reduction of these products has occurred, and in consequence, rubber modified styrenic resins are often used in place of the ABS resins. Furthermore, these rubber modified styrenic resins become used to manufacture molded articles having a large size, a complex shape and a small wall thickness. Under such situations, a rubber modified styrenic resin having high gloss, excellent moldability and workability, and high impact strength is desired.

The rubber modified styrenic resin is a styrenic resin in which rubber particles are dispersed, but the particle size of the dispersed rubber particles has a large influence on the quality of products. The smaller the particle size of the dispersed rubber particles, the better the gloss of molded articles that is obtained therefrom. The size of the rubber particles (an average particle size; the same shall apply hereinafter) in the rubber modified styrenic resin is usually in the range of from about 1.0 to about 5.0 μm. Nowadays, in order to improve the gloss of the molded articles, a resin has been developed in which the rubber particles of 1.0 μm or less are dispersed. Usually, in the rubber modified styrenic resin in which the rubber particles having a particle size of 1.0 μm or less are dispersed, impact strength is noticeably low. Therefore, it is difficult to improve the gloss, while the impact strength of the molded articles is maintained. In order to solve these problems, there have been suggested some methods which comprise the step of blending a rubber modified styrenic resin containing dispersed rubber particles of 1.0 μm or less with another rubber modified styrenic resin containing dispersed rubber particles of 1.0 μm or more in Japanese Patent Publication No. 41467/1971, Japanese Patent Application Laid-open Nos. 1519/1984 and 241053/1988, and U.S. Pat. No. 4,146,589. However, these methods still have some drawbacks such the insufficient gloss and the poor balance between the impact strength and the gloss.

It is well known that when a styrene monomer in which a styrene-butadiene block copolymer having a high styrene content is dissolved as a rubber component is polymerized, a polystyrene can be obtained in which rubber particles having a particle size of 0.5 μm or less and a capsule particle morphology are dispersed [e.g., Angew. Makromol. Chem., 58/59, pp. 175–198 (1977)]. Japanese Patent Publication No. 18594/1973 and Japanese Patent Application Laid-open Nos. 500497/1986, 48317/1988 and 74209/1989 have suggested some methods for preparing rubber modified styrenic resins which are very excellent in gloss and transparency of molded articles by the utilization of the above-mentioned well-known technique. According to these methods, the surface gloss and transparency of the molded articles can be indeed remarkably improved in contrast to the conventional rubber modified styrenic resins. However, the impact strength is still insufficient, though its improvement has been attempted.

In U.S. Pat. No. 4,493,922, Japanese Patent Application Laid-open No. 112646/1988 and the like, it is attempted that a rubber modified styrenic resin, in which rubber particles having a capsule particle morphology formed by using the above-mentioned styrene-butadiene copolymer rubber are dispersed, is blended with a usual rubber modified styrene resin containing a small amount of dispersed rubber particles having a cell or coil particle morphology so that the particle size distribution curve of the dispersed rubber particles may have two peaks (so that the distribution curve may have two maximum values) and so as to improve the impact strength, while the gloss of molded articles obtained therefrom is maintained at a high level. In these methods, the impact strength can be indeed improved, but the gloss is still insufficient and even the impact strength is still unsatisfactory. Therefore, there is a problem that a polydimethylsiloxane or the like must be added to the resin.

SUMMARY OF THE INVENTION

An object of the present invention is to provide a rubber modified styrenic resin which is excellent in appearance and impact strength as molded articles as compared with conventional rubber modified styrenic resins, and a method for preparing the styrenic resin.

Another object of the present invention is to provide a rubber modified styrenic resin desirable as a resin material for molded articles which can be obtained by injection molding and which has a large size, a small wall thickness and a complex shape.

In view of the importance of the above-mentioned objects, the present inventors have intensively investigated, and as a result, they have found that when a rubber modified styrenic resin composition is molded which meets the following requirements (1) to (3):

(1) to reduce the particle size of rubber particles having a cell or coil particle morphology, (2) to disperse rubber particles having a capsule particle morphology, to regulate the particle size distribution of the rubber particles so as to have one peak, and to regulate the volume-average particle size of the rubber particles so as to be in the range of from 0.2 to 0.8 μm, and (3) to have a higher particle size distribution than in a conventional resin, and to control a defined index, i.e., a ratio of a 5% value to a 95% value of the cumulative distribution of the particle size on the basis of the volume of the rubber-like polymer particles, the appearance and particularly the gloss of the molded articles can be remarkably improved, and impact strength can also be increased. In consequence, the present invention has now been completed.

The rubber modified styrenic resin composition of the present invention is directed to a rubber modified styrenic resin composition obtained by dispersing rubber-like polymer particles in a homopolymer or a copolymer of a styrenic monomer, said rubber modified styrenic resin composition being characterized in that:

(a) a volume-average particle size of the rubber-like polymer particles is in the range of from 0.2 to 0.8 μm, (b) a particle size distribution curve on the basis of the volume of the rubber-like polymer particles has one peak, (c) a ratio of a 5% value to a 95% value of the cumulative distribution of the particle size on the basis of the volume of the rubber-like polymer particles is in the range of from 3 to 45, (d) the rubber-like polymer which is a formation material of the rubber-like polymer particles comprises (i) a styrene-butadiene block copolymer (I) having a 5% by weight styrene solution viscosity of 20–50 centipoise and a styrene content of 25–50% by weight, and (ii)

(1) a styrene-butadiene block copolymer (II) having a 5% by weight styrene solution viscosity of 20–50 centipoise and a styrene content of 5–20% by weight (a weight ratio of the styrene-butadiene block copolymer (I) to the styrene-butadiene block copolymer (II) is from 95/5 to 40/60), (2) a polybutadiene (III) having a 5% weight styrene solution viscosity of 20–100 centipoise (a weight ratio of the styrene-butadiene block copolymer (I) to the polybutadiene (III) is from 95/5 to 40/60), or (3) a styrene-butadiene block copolymer (IV) having a 5% by weight styrene solution viscosity of 20–50 centipoise and a styrene content of 5–20% by weight, and a polybutadiene (V) having a 5% weight styrene solution viscosity of 30–90 centipoise (a weight ratio (I)/(IV) of (I) to (IV) is 95/5 to 40/60, and a weight ratio [(I)+ (IV)]/(V) of the sum of (I) and (IV) to (V) is from 99/1 to 70/30.

The above-mentioned rubber-like polymer particles contain particles having a cell or coil particle morphology and a capsule particle morphology. In one embodiment which the present invention covers, a volume-average particle size of the particles having the cell or coil particle morphology is from 0.3 to 2.0 μm, a volume-average particle size of the particles having the capsule particle morphology is from 0.1 to 1.0 μm, a ratio of the number of the particles having the capsule particle morphology to the number of the total particles is from 30 to 99%, and a ratio of the number of the particles having the cell or coil particle morphology to the number of the total particles is from 70 to 1%.

Furthermore, the present invention is directed to a method for preparing a rubber-modified styrenic resin composition which comprises the steps of dissolving rubber-like polymers (i) and (ii) in a styrenic monomer or a mixture of styrenic monomers, and then polymerizing the solution, the method being characterized in that the reaction solution is stirred in a reactor for pulverizing the rubber-like polymers so that a value of a Froude number Fr which can be defined by the following formula (VII) may be in the range of from 0.07 to 1.5:

$$Fr=(n^2 \times d)/g_c \qquad (VII)$$

wherein d is a diameter (m) of stirring blades in the reactor, n is a stirring revolution number (1/s), and $g_c$ is an acceleration (m/s$^2$) of gravity, while a conversion C of the styrenic monomer or the mixture of the styrenic monomers in the reactor is controlled so as to meet a value A of the following formula $$42 \leq A \leq 52$$

wherein $$A=X+2.33 \times Y+(Z-40) \qquad (VI)$$

$$X=C \times S+100,$$

S is a concentration (% by weight) of the feed styrenic monomer or the mixture of the styrenic monomers with respect to the weight of a feed material; X is a ratio (% by weight) of the styrenic polymer to the reaction solution; Y is a ratio (% by weight) of the total weight of the rubber-like polymers to the reaction solution; and Z is a styrene content (% by weight) in the rubber-like polymer (I).

The rubber modified styrenic resin composition of the present invention is excellent in impact resistance, appearance, and particularly a balance between impact resistance and gloss of molded articles. Thus, the resin composition of the present case is very industrially valuable in applications of domestic appliances, electronic equipments and the like.

BRIEF DESCRIPTION OF THE DRAWINGS

FIG. 1 (a) is a plan view of an injection-molded test piece which is used to evaluate practical impact strength and gloss, and FIG. 1 (b) is a sectional view of the same.

1 . . . Molded article

DETAILED DESCRIPTION OF THE PREFERRED EMBODIMENTS

Examples of a styrenic monomer which can be used in the present invention include side-chain alkyl-substituted styrenes such as styrene, α-methylstyrene and α-ethylstyrene, nuclear alkyl-substituted styrenes such as vinyltoluene, vinylxylene, o-t-butylstyrene, p-t-butylstyrene and p-methylstyrene, halogenated sytrenes such as monochlorostyrene, dichlorostyrene, tribromostyrene and tetrahydrostyrene, and p-hydroxystyrene and o-methoxystyrene. The particularly preferable examples are styrene, α-methylstyrene and p-methylstyrene. As the styrenic monomer, these compounds can be used singly or in a mixture of two or more thereof.

Rubber-like polymer particles are particles of a styrenic polymer in which a styrene-butadiene block copolymer and a polybutadiene are dispersed, and this kind of rubber-like polymer particles can be obtained by adding predetermined amounts of a styrene-butadiene block copolymer (I), (II) or (IV) and a polybutadiene (III) or (V) to the above-mentioned styrene or a mixture of the styrenes, and then polymerizing them.

Here, the styrene-butadiene block copolymer (I) has a styrene content of 25–50% by weight and a 5% by weight styrene solution viscosity of 20–50 centipoise. Furthermore, the styrene-butadiene block copolymer (II) has a styrene content of 5–20% by weight and a 5% by weight styrene solution viscosity of 20–50 centipoise.

The polybutadiene (III) has a 5% by weight styrene solution viscosity of 20–100 centipoise.

The styrene-butadiene block copolymer (IV) has a styrene content of 5–20% by weight and a 5% by weight styrene solution viscosity of 20–50 centipoise. In addition, the polybutadiene (V) has a 5% weight styrene solution viscosity of 30–90 centipoise.

In the present invention, the volume-average particle size of the rubber-like polymer particles formed by the above-mentioned procedure is required to be in the range of from 0.2 to 0.8 μm. This volume-average particle size can be measured in the following manner. That is, a resin is first sliced by an ultra-thin slice method to form an extra-thin specimen, and an electron microscope photograph of this specimen is then taken. In the photograph, small and large diameters of the 500 to 700 rubber particles are measured to obtain an average particle diameter, and the volume-average particle size is then calculated in accordance with the following formula.

$$\text{Volume-average particle size} = \Sigma nD^4 / \Sigma nD^3$$

wherein n is the number of the rubber particles having a particle diameter D μm.

When this volume-average particle diameter is less than 0.2 μm, the resulting rubber modified styrene resin has low impact strength, and when it is more than 0.8 μm, molded articles obtained therefrom have poor appearance, particularly low surface gloss.

The volume-average particle size can be regulated by the alteration of the stirring violence of a stirrer (which can be defined by Froude number $Fr=(n^2 \times d)/g_c$) in a reactor for pulverizing the rubber-like polymer, reaction temperature and the amount of an organic peroxide. When the Froude number is increased, the particle size decreases; when the reaction temperature is raised, the particle size increases; and when the amount of the organic peroxide is increased, the particle size decreases. Thus, the control of the volume-average particle size can be achieved by adjusting these factors.

In the present invention, a size distribution curve of the rubber-like polymer particles is required to have one peak.

"The size distribution curve of the rubber-like polymer particles has one peak" means a distribution where in the case that the particle size on a volume-average standard is plotted every 0.1 μm unit along an abscissa axis and frequency is plotted along an ordinate axis, the curve monotonously rises before the position of a mode diameter (a maximum frequency diameter) and a point of inflection on the distribution curve is one or less, and the curve monotonously drops after the position of the mode diameter and the point of inflection on the distribution curve is one or less.

When the distribution curve has two peaks, impact resistance can be improved, but the appearance of molded articles is poor and particularly a gloss gradient increases. The shape of the distribution curve of the polymer particles can be regulated by changing a molecular weight distribution of the rubber-like polymers to be used, a ratio of the rubber-like polymers to be mixed, and the like. In the present invention, "the gloss gradient" means a difference of the gloss attributed to a difference between distances from gates of injection-molded articles, or a difference of the gloss between a standard position and a position where a wall thickness of the molded article changes or a position such as an angular position where a flow state largely changes at the time of injection molding.

With regard to the control of the shape of the distribution curve of the rubber-like polymer particles, the distribution curve of the rubber-like polymer particles having one peak can be formed by adjusting a mixing ratio of the rubber-like polymers, i.e., (I)/(II), (I)/(III) or (I)/(IV) into 95/5 to 40/60 by weight.

In addition, it is preferred that the molecular weight distribution of the rubber-like polymer has one peak.

In the present invention, a ratio D1/D2 (hereinafter referred to as "the coefficient of distribution") is required to be in the range of from 3 to 45, wherein D1 is a particle diameter at which a cumulative distribution is 5% when the rubber-like polymer particles are cumulatively counted from the side of the particles having a larger particle size on the volume standard of the rubber-like polymer particles, and D2 is a particle diameter at which the cumulative distribution is 95%. Preferably, the coefficient of distribution is in the range of from 3.5 to 40, and more preferably from 4 to 35. When the coefficient of distribution is less than 3, impact strength is not so effectively improved, and when it is in excess of 45, the appearance of the molded articles is poor and particularly the gloss gradient increases. The coefficient of distribution can be regulated by changing the molecular weight distribution of the rubber-like polymers, the mixing ratio of the rubber-like polymers, the stirring violence and the residence time at the time of the polymerization, and the like.

When the rubber-like polymers having the wide molecular weight distribution are used, the coefficient of distribution increases. When the mixing ratio of the rubber-like polymers, i.e., (I)/(II), (I)/(III) or (I)/(IV) is lowered, the coefficient of distribution decreases. Moreover, the buildup of the stirring violence leads to the decrease in the coefficient of distribution, and the prolongation of the residence time leads to the decrease in the coefficient of distribution. Thus, the coefficient of distribution can be controlled by adjusting these factors.

In the present invention, a weight ratio [(I)/(II)] of the above-mentioned rubber-like polymer (I) to the rubber-like polymer (II) is preferably in the range of from 95/5 to 40/60. When the weight ratio [(I)/(II)] is in excess of 95/5, the impact strength declines, and when it is less than 40/60, the gloss deteriorates.

A weight ratio [(I)/(III)] of the rubber-like polymer (I) to the rubber-like polymer (III) is preferably in the range of from 95/5 to 40/60. When the weight ratio [(I)/(III)] is in excess of 95/5, the impact strength declines, and when it is less than 40/60, the gloss deteriorates.

Furthermore, a weight ratio [(I)/(IV)] of the rubber-like polymer (I) to the rubber-like polymer (IV) is preferably in the range of from 95/5 to 40/60. When the weight ratio [(I)/(IV)] is in excess of 95/5, the impact strength declines, and when it is less than 40/60, the gloss deteriorates. In addition, a weight ratio [(I)+ (IV)]/(V) of the sum of the rubber-like polymers (I) and (IV) to the rubber-like polymer (V) is preferably in the range of from 99/1 to 70/30. When the weight ratio [(I)+ (IV)]/(V) is less than of 70/30, the gloss deteriorates, and when it is in excess of 99/1, the impact strength declines.

The rubber modified styrenic resin composition of the present invention in which the rubber-like polymers (I) and (II) are dispersed can be obtained by a method which comprises preparing, for example, the rubber modified styrenic resin composition containing the rubber-like polymer (I) and the rubber modified styrenic resin composition containing the rubber-like polymer (II) separately, and then blending both the compositions by an extruder or the like, or a method which comprises previously mixing the rubber-like polymers (I) and (II) in a polymerization reactor, and then polymerizing them with a styrenic monomer. However, preferable is the method in which the rubber-like polymers (I) and (II) are mixed in the polymerization reactor.

The other rubber-like polymers (III), (IV) and (V) can also be mixed in the same manner as mentioned above.

The present invention covers an embodiment in which the rubber-like polymer particles have a cell or coil particle morphology and a capsule particle morphology.

In the present invention, "the cell or coil particle morphology" means a particle structure having a plurality of occlusions in one rubber particle, which can be observed in an electron microscope photograph of a resin sliced by an ultra-thin slice method. Furthermore, "the capsule particle morphology" means a particle structure having only one occlusion in one rubber particle.

In the present invention, it is preferable to regulate the volume-average particle size of the particles having the cell or coil morphology among the rubber-like polymer particles into the range of from 0.3 to 2.0 μm, the volume-average particle size of the particles having the capsule particle morphology into the range of from 0.1 to 1.0 μm, a ratio of the number of the particles having the capsule particle morphology to the total number of the particles into the range of from 30 to 99%, and a ratio of the number of the particles having the cell or coil particle morphology into the range of from 70 to 1%. In this case, it is necessary that the volume-average particle size of the rubber-like polymer particles is in the range of from 0.2 to 0.8 μm.

The increase in the Froude number leads to the decrease in the number of the particles having the cell or coil particle morphology, the rise of the reaction temperature leads to the increase in the number of the particles having the cell or coil particle morphology, and the increase in the organic peroxide leads to the decrease in the number of the particles having the cell or coil particle morphology. Thus, the number of the particles having the cell or coil particle morphology can be controlled by adjusting these factors.

When the volume-average particle size of the particles having the cell or coil particle morphology is more than 2.0 μm, the appearance of the molded articles deteriorates, and particularly the gloss gradient increases. When it is less than 0.3 μm, the impact strength declines. On the other hand, when the volume-average particle size of the particles having the capsule particle morphology is more than 1.0 μm, the gloss deteriorates, and when it is less than 0.1 μm, the impact strength declines. Furthermore, when the number of the particles having the capsule particle morphology is less than 30%, the gloss deteriorates and the gloss gradient increases, and when it is more than 99%, the impact strength declines.

In the rubber modified styrenic resin composition regarding the present invention which can meet the above-mentioned requirements, a weight ratio of the rubber-like polymer to the styrenic polymer is preferably in the range of from 3/97 to 25/75. When the weight ratio is less than 3/97, the gloss of the molded articles is excellent but the impact strength is low. When it is in excess of 25/75, the impact strength is improved but the gloss deteriorates and the gloss gradient increases.

The rubber modified styrene resin composition of the present invention can be prepared by dissolving (1) rubber-like polymers (I) and (II),
(2) rubber-like polymers (I) and (III), or
(3) rubber-like polymers (I), (IV) and (V) in a styrenic monomer, and then polymerizing the resultant solution by mass polymerization or mass-suspension two-step polymerization. In any case, the reaction solution is stirred in a reactor for pulverizing the rubber-like polymer so that a value of a Froude number Fr which can be defined by the following formula (VII) may be in the range of from 0.07 to 1.5:

$$Fr = (n^2 \times d)/g_c \qquad (VII)$$

wherein d is a diameter (m) of stirring blades in the reactor, n is a stirring revolution number (1/s), and $g_c$ is an acceleration (m/s²) of gravity, while a conversion C of the styrenic monomer or the mixture of the styrenic monomers in the reactor is controlled so as to meet a value A of the following formula $$42 \leq A \leq 52$$

wherein $$A = X + 2.33 \times Y + (Z-40) \qquad (VI)$$

$$X = C \times S \div 100,$$

S is a concentration (% by weight) of the feed styrenic monomer or the mixture of the styrenic monomers with respect to the weight of a feed material; X is a ratio (% by weight) of the styrenic polymer to the reaction solution; Y is a ratio (% by weight) of the total weight of the rubber-like polymer to the reaction solution; and Z is a styrene content (% by weight) in the rubber-like polymer (I).

The formation of the particles is possible even outside this range, but in this case, abnormal particles are formed. When the value of A is less than 42, the rubber particles like sticks are formed, which can be confirmed by observing an electron microscope photograph of the obtained articles. In consequence, the gloss and the impact strength of the molded articles are low. Conversely, when the value of A is more than 52, gigantic particles are formed, so that the gloss deteriorates. Meeting the above-mentioned formula (VI) with the above-mentioned values means that the conversion of the styrenic monomer is adjusted so that the amount of the styrenic polymer may increase in the reactor for pulverizing the rubber-like polymers, in the case that the amount of the rubber-like polymers is large or in the case that the styrene content in an rubber-like polymer (I) is high in the reactor. It also means that a conversion of the styrenic monomer is adjusted so that the amount of the styrenic polymer may decrease in the reactor for pulverizing the rubber-like polymers, in a converse case.

For example, when a styrene content Z in the rubber-like polymer (I) is high, the value of A can be controlled by raising the polymerization temperature or prolonging the residence time in the reactor so that the ratio of the styrenic polymer (X) may increase.

In the present invention, the conversion of the styrenic monomer can be adjusted in a known manner, for example, by changing the polymerization temperature, a kind or concentration of polymerization initiator to be used or the polymerization time, and in the case of a continuous polymerization method, by changing the residence time and the like.

If the polymerization temperature is raised, the conversion is high, and if the concentration of the organic peroxide is heightened, the conversion is high. Moreover, if the residence time is prolonged, the conversion is high. Thus, the conversion can be controlled by adjusting these factors.

In the present invention, any polymerization initiator may not be used in pulverizing the rubber-like polymers, but it is preferable to employ the initiator. In the case that the polymerization initiator is used, an organic peroxide is preferably used as the polymerization initiator in an amount of from 0.0005 to 0.007 part by weight based on 100 parts by weight of a solution in which the rubber-like polymers are dissolved. When the amount of the organic peroxide is more than 0.007 part by weight, gigantic particles are partially formed, so that the gloss deteriorates sometimes. If necessary, optional additives may be added to the rubber modified styrenic resin composition of the present invention, and examples of the additives include an antioxidant such as a hindered phenol-based antioxidant, a phosphorus-based antioxidant or a sulfur-based antioxidant, a flowability improver such as a mineral oil, and a mold release agent such as stearic acid, zinc stearate or an organic polysiloxane. The addition of these additives can be carried out at a time when the materials are in the state of a solution, during the polymerization, or after the polymerization.

Now, the present invention will be described in detail in reference to examples, but the scope of the present invention should not be limited to these examples.

Evaluation of Physical Properties (1) Izod Impact Strength: This was measured in accordance with JIS K-6871.

(2) Evaluation of Practical Impact Strength: For injection-molded articles having a structure shown in FIGS. 1 (a) and 1 (b), a falling ball impact strength test was made at three positions, i.e., positions (1), (2) and (3) thereof. Inner diameters of a tip portion R and a carrier of the falling ball were 6.4 mm and 25 mm, respectively. The position (1) is a position where thickness changes, and the position (2) is a position near to an angle, and the position (3) is a standard position.

(3) Gloss: For the molded articles having the structure shown in FIGS. 1 (a) and 1 (b), a gloss test was made at the three positions [the positions (1), (2) and (3)] in accordance with JIS 8741 (angle of incidence= 60°).

EXAMPLE 1

A rubber modified styrenic resin composition was prepared by the use of a continuous mass polymerization device comprising three serial reactors equipped with stirrers, a preheater and a vacuum chamber at the outlet of the reactors. A material solution comprising 4.2 parts by weight of a styrene-butadiene copolymer having a styrene content of 42 wt % and a 5 wt % styrene solution viscosity of 32 centipoise as a rubber-like polymer (I), 1.8 parts by weight of a styrene-butadiene block copolymer having a styrene content of 15 wt % and a 5 wt % styrene solution viscosity of 30 centipoise as a rubber-like polymer (II), 15 parts of ethylbenzene, 79 parts of styrene, and 0.005 part by weight of 1,1-bis(t-butylperoxy)-3,3,5-trimethylcyclohexane as an organic peroxide was continuously fed to the first reactor equipped with the stirrer. In the first reactor, the stirring velocity of the stirrer was 300 rpm (Fr=0.459), reaction temperature was 142° C. and residence time was 1.5 hours. In the second reactor, the reaction temperature was 145° C., and the residence time was 2 hours. In the third reactor, the reaction temperature was 145° C., and the residence time was 2.5 hours. The temperature of the preheater was maintained at 210°–240° C., and the vacuum degree in the vacuum chamber was set to 40 Torr. The results are shown in Tables 1 and 2.

EXAMPLE 2

A rubber modified styrenic resin composition was prepared under the same conditions as in Example 1 except that stirring velocity in the first reactor was 200 rpm (Fr= 0.204).

EXAMPLE 3

A rubber modified styrenic resin composition was prepared under the same conditions as in Example 1 except that stirring velocity in the first reactor was 400 rpm (Fr= 0.816).

COMPARATIVE EXAMPLE 1

A rubber modified styrenic resin composition was prepared under the same conditions as in Example 1 except that stirring velocity in the first reactor was 100 rpm (Fr= 0.051). A volume-average particle size of rubber-like polymer particles in the obtained product was large, 0.95 μm, and gloss was low.

COMPARATIVE EXAMPLE 2

A rubber modified styrenic resin composition was prepared under the same conditions as in Example 1 except that stirring velocity in the first reactor was 550 rpm (Fr= 1.543). An average particle size of rubber-like polymer particles in the obtained product was small, 0.15 μm, and impact strength was low.

COMPARATIVE EXAMPLE 3

A rubber modified styrenic resin composition (A) having a small average rubber-like polymer particle size of 0.35 μm and a capsule particle morphology was prepared under the same conditions as in Example 1 except that the amount of a rubber-like polymer (I) was 6 parts by weight and rubber-like polymer (II) was not used. Separately, another rubber modified styrenic resin composition (B) having a large average rubber-like polymer particle size of 1.15 μm and a cell or coil particle morphology was prepared under the same conditions as in Example 1 except that rubber-like polymers (I) and (II) were replaced with 6 parts by weight of a polybutadiene having a 5 wt % styrene solution viscosity of 50 centipoise. The rubber-modified styrenic resins (A) and (B) were mixed in a ratio of 85/15 by weight, and the mixture was then melted and kneaded by an extruder to obtain a product. The particle size distribution of the thus obtained rubber-like polymer had two peaks, and molded articles obtained therefrom had a large gloss gradient.

COMPARATIVE EXAMPLE 4

A rubber modified styrenic resin composition was prepared under the same conditions as in Example 1 except that residence time in the first reactor was 45 minutes. The obtained product had a large distribution coefficient of 49, and molded articles obtained therefrom had a large gloss gradient.

COMPARATIVE EXAMPLE 5

A rubber modified styrenic resin composition was prepared under the same conditions as in Example 1 except that residence time in the first reactor was 3 hours. The obtained product had a small distribution coefficient of 2.5, and impact resistance was low.

EXAMPLE 4

A rubber modified styrenic resin composition was prepared under the same conditions as in Example 1 except that 5.4 parts by weight of a rubber-like polymer (I) and 0.6 part by weight of a rubber-like polymer (II) were used.

EXAMPLE 5

A rubber modified styrenic resin composition was prepared under the same conditions as in Example 1 except that 2.7 parts by weight of a rubber-like polymer (I) and 3.3 parts by weight of a rubber-like polymer (II) were used.

COMPARATIVE EXAMPLE 6

A rubber modified styrenic resin composition (A) prepared in Comparative Example 3 was molded as it was, and physical properties were then evaluated. Gloss was high, but impact resistance was low.

COMPARATIVE EXAMPLE 7

A rubber modified styrenic resin composition was prepared under the same conditions as in Example 1 except that 1.8 parts by weight of a rubber-like polymer (I) and 4.2 parts by weight of a rubber-like polymer (II) were used. Gloss was low.

EXAMPLE 6

A rubber modified styrenic resin composition was prepared under the same conditions as in Example 1 except that reaction temperature was 138° C. The conversion of a styrene monomer in the first reactor was 34%.

EXAMPLE 7

A rubber modified styrenic resin composition was prepared under the same conditions as in Example 1 except that reaction temperature was 148° C. The conversion of a styrene monomer in the first reactor was 43%.

EXAMPLE 8

A rubber modified styrenic resin composition was prepared under the same conditions as in Example 1 except that reaction temperature was 144° C. and any organic peroxide was not used.

COMPARATIVE EXAMPLE 8

A rubber modified styrenic resin composition was prepared under the same conditions as in Example 1 except that reaction temperature was 134° C. The conversion of a styrene monomer in the first reactor was 30%. According to the observation of the obtained product by an electron microscope photograph, particles like sticks were seen, and gloss and impact strength were low.

COMPARATIVE EXAMPLE 9

A rubber modified styrenic resin composition was prepared under the same conditions as in Example 1 except that reaction temperature was 152° C. The conversion of a styrene monomer in the first reactor was 48%. According to the observation of the obtained product by an electron microscope photograph, gigantic particles were present, and gloss was low.

COMPARATIVE EXAMPLE 10

A rubber modified styrenic resin composition was prepared under the same conditions as in Example 1 except that reaction temperature was 139° C. and 0.01 part by weight of an organic peroxide was used. The conversion of a styrene monomer in the first reactor was 40%. According to the observation of the obtained product by an electron microscope photograph, gigantic particles were present, and gloss was low.

TABLE 1

| | | Example | | | Comp. Example | | | | | Example | |
|---|---|---|---|---|---|---|---|---|---|---|---|
| | | 1 | 2 | 3 | 1 | 2 | 3 | 4 | 5 | 4 | 5 |
| Conditions of Preparation | | | | | | | | | | | |
| Amount of organic peroxide | pts. wt. | 0.005 | 0.005 | 0.005 | 0.005 | 0.005 | 0.005 | 0.005 | 0.005 | 0.005 | 0.005 |
| Conversion of monomer in reactor for forming particles | % | 39 | 39 | 39 | 39 | 39 | 39 | 39 | 39 | 39 | 39 |
| Value of formula (VI) | | 46.8 | 46.8 | 46.8 | 46.8 | 46.8 | 46.8 | 46.8 | 46.8 | 46.8 | 46.8 |
| Structure of Resin | | | | | | | | | | | |
| Volume-average particle size of rubber-like polymer particles | μm | 0.55 | 0.75 | 0.25 | 0.95 | 0.15 | 0.50 | 0.60 | 0.50 | 0.45 | 0.65 |
| Particle size distribution on basis of volume of rubber-like polymer particles | — | One peak | One peak | One peak | One peak | One peak | Two peaks | One peak | One peak | One peak | One peak |
| Coefficient of distribution*1 | | 6.4 | 35.0 | 4.0 | 38.0 | 3.5 | 12.0 | 49.0 | 2.5 | 4.5 | 10.0 |
| Rubber-like polymer (I)*2 | wt % | 70 | 70 | 70 | 70 | 70 | 85 | 70 | 70 | 90 | 45 |
| Rubber-like polymer (II) | | 30 | 30 | 30 | 30 | 30 | 15 | 30 | 30 | 10 | 55 |
| Average particle size of particles having capsule particle morphology | μm | 0.35 | 0.55 | 0.15 | 0.75 | 0.10 | 0.35 | 0.40 | 0.30 | 0.30 | 0.45 |
| Average particle size of particles having cell or coil particle morphology | μm | 1.20 | 1.70 | 1.15 | 2.20 | 0.60 | 1.15 | 1.25 | 1.10 | 1.15 | 1.20 |
| Gigantic particles | | Absent | Absent | Absent | Absent | Absent | Absent | Absent | Absent | Absent | Absent |
| Stick-like particles | | Absent | Absent | Absent | Absent | Absent | Absent | Absent | Absent | Absent | Absent |
| Evaluation of Physical Properties | | | | | | | | | | | |
| Izod impact strength (notched, thickness = 6.4 mm) | kgcm/cm | 12.0 | 13.0 | 11.0 | 13.5 | 4.0 | 11.5 | 12.5 | 5.5 | 11.5 | 12.5 |
| Practical impact strength | | | | | | | | | | | |
| Position (1) | kg · cm | 48 | 52 | 45 | 50 | 20 | 47 | 51 | 19 | 43 | 50 |
| Position (2) | kg · cm | 50 | 55 | 48 | 53 | 27 | 48 | 53 | 27 | 45 | 58 |
| Position (3) | kg · cm | 80 | 82 | 78 | 81 | 40 | 79 | 81 | 43 | 75 | 80 |
| Gloss | | | | | | | | | | | |
| Position (1) | % | 91 | 90 | 92 | 51 | 93 | 71 | 68 | 92 | 93 | 91 |

TABLE 1-continued

|  |  | Example | | | Comp. Example | | | | | Example | |
| --- | --- | --- | --- | --- | --- | --- | --- | --- | --- | --- | --- |
|  |  | 1 | 2 | 3 | 1 | 2 | 3 | 4 | 5 | 4 | 5 |
| Position (2) | % | 95 | 93 | 97 | 58 | 96 | 75 | 70 | 95 | 97 | 94 |
| Position (3) | % | 97 | 96 | 98 | 60 | 99 | 98 | 96 | 98 | 99 | 97 |

*1: A ratio of a 5% value to a 95% value of the cumulative distribution of the particle size on the basis of the volume of the rubber-like polymer particles.

*2: The total of the rubber-like polymers was regarded as 100% by weight.

TABLE 2

|  |  | Comp. Example | | Example | | | Comparative Example | | |
| --- | --- | --- | --- | --- | --- | --- | --- | --- | --- |
|  |  | 6 | 7 | 6 | 7 | 8 | 8 | 9 | 10 |
| Conditions of Preparation |  |  |  |  |  |  |  |  |  |
| Amount of organic peroxide | pts. wt. | 0.005 | 0.005 | 0.005 | 0.005 | 0 | 0.005 | 0.005 | 0.01 |
| Conversion of monomer in reactor for forming particles | % | 39 | 39 | 34 | 43 | 40 | 30 | 48 | 40 |
| Value of formula (VI) |  | 46.8 | 46.8 | 42.8 | 50.0 | 47.6 | 39.7 | 53.9 | 47.6 |
| Structure of Resin |  |  |  |  |  |  |  |  |  |
| Volume-average particle size of rubber-like polymer particles | μm | 0.35 | 0.75 | 0.60 | 0.65 | 0.55 | 0.40 | 0.75 | 0.70 |
| Particle size distribution on basis of volume of rubber-like polymer particles | — | One peak | One peak | One peak | One peak | One peak | One peak | One peak | One peak |
| Coefficient of distribution*1 |  | 5.6 | 15.0 | 7.5 | 8.5 | 6.5 | 4.3 | 15.0 | 18.0 |
| Rubber-like polymer (I)*2 | wt % | 100 | 30 | 70 | 70 | 70 | 70 | 70 | 70 |
| Rubber-like polymer (II) |  | 0 | 70 | 30 | 30 | 30 | 30 | 30 | 30 |
| Average particle size of particles having capsule particle morphology | μm | 0.35 | 0.55 | 0.40 | 0.40 | 0.35 | 0.25 | 0.60 | 0.55 |
| Average particle size of particles having cell or coil particle morphology | μm | — | 1.30 | 1.20 | 1.25 | 1.20 | 1.15 | 1.80 | 1.60 |
| Gigantic particles |  | Absent | Absent | Absent | Absent | Absent | Absent | Present | Present |
| Stick-like particles | | Absent | Absent | Absent | Absent | Absent | Present | Absent | Absent |
| Evaluation of Physical Properties |  |  |  |  |  |  |  |  |  |
| Izod impact strength (notched, thickness = 6.4 mm) | kgcm/cm | 3.5 | 13.5 | 11.0 | 11.5 | 12.5 | 4.5 | 10.0 | 12.0 |
| Practical impact strength |  |  |  |  |  |  |  |  |  |
| Position (1) | kg · cm | 15 | 55 | 49 | 50 | 51 | 18 | 40 | 45 |
| Position (2) | kg · cm | 19 | 57 | 51 | 52 | 56 | 21 | 43 | 48 |
| Position (3) | kg · cm | 35 | 83 | 80 | 79 | 84 | 41 | 70 | 75 |
| Gloss |  |  |  |  |  |  |  |  |  |
| Position (1) | % | 94 | 81 | 91 | 90 | 92 | 70 | 65 | 68 |
| Position (2) | % | 96 | 85 | 94 | 93 | 96 | 73 | 71 | 70 |
| Position (3) | % | 99 | 90 | 98 | 95 | 98 | 85 | 83 | 82 |

*1: A ratio of a 5% value to a 95% value of the cumulative distribution of the particle size on the basis of the volume of the rubber-like polymer particles.
*2: The total of the rubber-like polymers was regarded as 100% by weight.

With regard to rubber modified styrenic resin compositions prepared in the following examples and comparative examples, the evaluation results of physical properties are shown in Tables 3 and 4.

EXAMPLE 9

A rubber modified styrenic resin composition was prepared by the use of a continuous mass polymerization device comprising three serial reactors equipped with stirrers, a preheater and a vacuum chamber at the outlet of the reactors. A material solution comprising 4.2 parts by weight of a styrene-butadiene copolymer having a styrene content of 45 wt % and a 5 wt % styrene solution viscosity of 35 centipoise as a rubber-like polymer (I), 1.8 parts by weight of a polybutadiene having a 5 wt % styrene solution viscosity of 30 centipoise as a rubber-like polymer (III), 15 parts of ethylbenzene, 79 parts of styrene, and 0.005 part by weight of 1,1-bis(t-butylperoxy)-3,3,5-trimethylcyclohexane as an organic peroxide was continuously fed to the first reactor equipped with the stirrer. In the first reactor, the stirring velocity of the stirrer was 300 rpm (Fr=0.459), reaction temperature was 142° C., and residence time was 1.5 hours. In the second reactor, the reaction temperature was 145° C., and the residence time was 2 hours. In the third reactor, the reaction temperature was 145° C., and the residence time was 2.5 hours. The temperature of the preheater was maintained at 210°–240° C., and the vacuum degree in the vacuum chamber was set to 40 Torr.

EXAMPLE 10

A rubber modified styrenic resin composition was prepared under the same conditions as in Example 9 except that stirring velocity in the first reactor was 200 rpm (Fr= 0.204).

EXAMPLE 11

A rubber modified styrenic resin composition was prepared under the same conditions as in Example 9 except that stirring velocity in the first reactor was 400 rpm (Fr= 0.816).

COMPARATIVE EXAMPLE 11

A rubber modified styrenic resin composition was prepared under the same conditions as in Example 9 except that stirring velocity in the first reactor was 100 rpm (Fr= 0.051). A volume-average particle size of rubber-like polymer particles in the obtained product was large, 0.98 μm, and gloss was low.

COMPARATIVE EXAMPLE 12

A rubber modified styrenic resin composition was prepared under the same conditions as in Example 9 except that stirring velocity in the first reactor was 550 rpm (Fr= 1.543). A volume-average particle size of rubber-like polymer particles in the obtained product was small, 0.13 μm, and impact strength was low.

COMPARATIVE EXAMPLE 13

A rubber modified styrenic resin composition (C) having a small volume average particle size of 0.35 μm and a capsule particle morphology was prepared under the same conditions as in Example 9 except that 6 parts by weight of a styrene-butadiene block copolymer were used as a rubber-like polymer (I) and any rubber-like polymer (III) was not used. Separately, another rubber modified styrenic resin composition (D) having a large average rubber-like polymer particle size of 1.15 μm and a cell or coil particle morphology was prepared under the same conditions as in Example 9 except that rubber-like polymer (I) was not used and 6 parts by weight of a polybutadiene having a 5 wt % styrene solution viscosity of 50 centipoise were used as the rubber-like polymer (III). The rubber-modified styrenic resin compositions (C) and (D) were mixed in a weight ratio of 85/15, and the mixture was then melted and kneaded by an extruder to obtain a product. The particle size distribution of the rubber particles dispersed in the thus obtained resin composition had two peaks, and molded articles obtained therefrom had a large gloss gradient.

COMPARATIVE EXAMPLE 14

A rubber modified styrenic resin composition was prepared under the same conditions as in Example 9 except that residence time in the first reactor was 45 minutes. The obtained product had a large cumulative particle size distribution coefficient of 49.5, and molded articles obtained therefrom had a large gloss gradient.

COMPARATIVE EXAMPLE 15

A rubber modified styrenic resin composition was prepared under the same conditions as in Example 9 except that residence time in the first reactor was 3 hours. The obtained product had a small cumulative particle size distribution coefficient of 2.3, and impact resistance was low.

EXAMPLE 12

A rubber modified styrenic resin composition was prepared under the same conditions as in Example 9 except that 5.4 parts by weight of a rubber-like polymer (I) and 0.6 part by weight of a rubber-like polymer (III) were used.

EXAMPLE 13

A rubber modified styrenic resin composition was prepared under the same conditions as in Example 9 except that 2.7 parts by weight of a rubber-like polymer (I) and 3.3 parts by weight of a rubber-like polymer (III) were used.

COMPARATIVE EXAMPLE 16

A rubber modified styrenic resin composition (C) prepared in Comparative Example 13 was molded as it was, and physical properties were then evaluated. Gloss was high, but impact resistance was low.

COMPARATIVE EXAMPLE 17

A rubber modified styrenic resin composition was prepared under the same conditions as in Example 9 except that 1.8 parts by weight of a rubber-like polymer (I) and 4.2 parts by weight of a rubber-like polymer (III) were used. Gloss was low.

EXAMPLE 14

A rubber modified styrenic resin composition was prepared under the same conditions as in Example 9 except that reaction temperature was 138° C. The conversion of a styrene monomer in the first reactor was 30.5%.

EXAMPLE 15

A rubber modified styrenic resin composition was prepared under the same conditions as in Example 9 except that reaction temperature was 148° C. The conversion of a styrene monomer in the first reactor was 39.5%.

EXAMPLE 16

A rubber modified styrenic resin composition was prepared under the same conditions as in Example 9 except that reaction temperature was 144° C. and any organic peroxide was not used.

COMPARATIVE EXAMPLE 18

A rubber modified styrenic resin composition was prepared under the same conditions as in Example 9 except that reaction temperature was 134° C. According to the observation of the obtained product in an electron microscope photograph, rubber particles like stick were seen, and gloss and impact strength were low.

COMPARATIVE EXAMPLE 19

A rubber modified styrenic resin composition was prepared under the same conditions as in Example 9 except that reaction temperature was 152° C. The conversion of a styrene monomer in the first reactor was 44.5%. According to the observation of the obtained product in an electron microscope photograph, gigantic particles were present, and gloss was low.

COMPARATIVE EXAMPLE 20

A rubber modified styrenic resin composition was prepared under the same conditions as in Example 9 except that reaction temperature was 139° C. and 0.01 part by weight of an organic peroxide was used. The conversion of a styrene monomer in the first reactor was 36%. According to the observation of the obtained product in an electron microscope photograph, gigantic particles were present, and gloss was low.

COMPARATIVE EXAMPLE 21

A rubber modified styrenic resin composition (E) having a small volume average particle size of 0.4 μm and a capsule particle morphology was prepared under the same conditions as in Example 9 except that 6 parts by weight of a styrene-butadiene block copolymer used in Example 9 were used as a rubber-like polymer (I) and any rubber-like polymer (III) was not used.

Separately, another rubber modified styrenic resin composition (F) having a large volume-average particle size of 5.0 μm and a cell or coil particle morphology was prepared under the same conditions as in Example 9 except that any rubber-like polymers (I) was not used and 6 parts by weight of a polybutadiene having a 5 wt % styrene solution viscosity of 150 centipoise were used as the rubber-like polymer (III) and stirring velocity in the first reactor was 200 rpm (Fr=0.204).

The rubber modified styrenic resin compositions (E) and (F) were mixed in a weight ratio of 90/10, and the mixture was then melted and kneaded by an extruder to obtain a product. The particle size distribution of the rubber particles dispersed in the thus obtained resin composition had two peaks, and molded articles obtained therefrom had a large gloss gradient.

TABLE 3

|  |  | Example | | | Comp. Example | | | | | Example | |
| --- | --- | --- | --- | --- | --- | --- | --- | --- | --- | --- | --- |
|  |  | 9 | 10 | 11 | 11 | 12 | 13 | 14 | 15 | 12 | 13 |
| Conditions of Preparation | | | | | | | | | | | |
| Amount of organic peroxide | pts. wt. | 0.005 | 0.005 | 0.005 | 0.005 | 0.005 | 0.005 | 0.005 | 0.005 | 0.005 | 0.005 |
| Conversion of monomer in reactor for forming particles | % | 35.5 | 35.5 | 35.5 | 35.5 | 35.5 | 39.0 | 35.5 | 35.5 | 35.5 | 35.5 |
| Value of formula (VI) |  | 47.0 | 47.0 | 47.0 | 47.0 | 47.0 | 46.8 | 47.0 | 47.0 | 47.0 | 47.0 |
| Structure of Resin | | | | | | | | | | | |
| Volume-average particle size of rubber-like polymer particles | μm | 0.60 | 0.78 | 0.25 | 0.98 | 0.13 | 0.50 | 0.65 | 0.52 | 0.48 | 0.66 |
| Particle size distribution on basis of volume of rubber-like polymer particles | — | One peak | One peak | One peak | One peak | One peak | Two peaks | One peak | One peak | One peak | One peak |
| Coefficient of distribution*1 |  | 6.0 | 34.5 | 4.2 | 38.5 | 3.8 | 12.0 | 49.5 | 2.3 | 4.2 | 10.3 |
| Rubber-like polymer (I)*2 | wt % | 70 | 70 | 70 | 70 | 70 | 85 | 70 | 70 | 90 | 45 |
| Rubber-like polymer (III) |  | 30 | 30 | 30 | 30 | 30 | 15 | 30 | 30 | 10 | 55 |
| Average particle size of particles having capsule particle morphology | μm | 0.40 | 0.58 | 0.20 | 0.80 | 0.10 | 0.35 | 0.43 | 0.32 | 0.34 | 0.47 |
| Average particle size of particles having cell or coil particle morphology | μm | 1.21 | 1.69 | 1.17 | 2.23 | 0.55 | 1.15 | 1.28 | 1.11 | 1.14 | 1.19 |
| Gigantic particles |  | Absent | Absent | Absent | Absent | Absent | Absent | Absent | Absent | Absent | Absent |
| Stick-like particles |  | Absent | Absent | Absent | Absent | Absent | Absent | Absent | Absent | Absent | Absent |
| Evaluation of Physical Properties | | | | | | | | | | | |
| Izod impact strength (notched, thickness = 6.4 mm) | kgcm/cm | 14.0 | 14.7 | 13.0 | 13.8 | 4.5 | 11.5 | 12.8 | 6.0 | 12.6 | 14.2 |
| Practical impact strength | | | | | | | | | | | |
| Position (1) | kg · cm | 52 | 57 | 50 | 51 | 18 | 47 | 52 | 18 | 47 | 54 |
| Position (2) | kg · cm | 57 | 61 | 53 | 54 | 28 | 48 | 55 | 28 | 53 | 63 |
| Position (3) | kg · cm | 85 | 86 | 84 | 80 | 39 | 79 | 81 | 45 | 78 | 86 |
| Gloss | | | | | | | | | | | |
| Position (1) | % | 85 | 85 | 86 | 49 | 94 | 71 | 67 | 91 | 86 | 85 |
| Position (2) | % | 89 | 89 | 90 | 55 | 97 | 75 | 69 | 95 | 91 | 89 |
| Position (3) | % | 92 | 91 | 92 | 59 | 99 | 98 | 96 | 98 | 93 | 91 |

*1: A ratio of a 5% value to a 95% value of the cumulative distribution of the particle size on the basis of the volume of the rubber-like polymer particles.

*2: The total of the rubber-like polymers was regarded as 100% by weight.?

TABLE 4

|  |  | Comp. Example | | Example | | | Comparative Example | | | |
| --- | --- | --- | --- | --- | --- | --- | --- | --- | --- | --- |
|  |  | 16 | 17 | 14 | 15 | 16 | 18 | 19 | 20 | 21 |
| Conditions of Preparation | | | | | | | | | | |
| Amount of organic peroxide | pts. wt. | 0.005 | 0.005 | 0.005 | 0.005 | 0 | 0.005 | 0.005 | 0.01 | 0.005 |
| Conversion of monomer in reactor for forming particles | % | 39.0 | 35.5 | 30.5 | 39.5 | 36.0 | 26.5 | 44.5 | 36.0 | 39 |
| Value of formula (VI) |  | 46.8 | 47.0 | 43.1 | 50.2 | 47.4 | 39.9 | 54.1 | 47.4 | 46.8 |
| Structure of Resin | | | | | | | | | | |
| Volume-average particle size of rubber-like polymer particles | μm | 0.35 | 0.78 | 0.63 | 0.68 | 0.59 | 0.42 | 0.77 | 0.75 | 0.5 |
| Particle size distribution on basis of volume of rubber-like polymer particles | — | One peak | One peak | One peak | One peak | One peak | One peak | One peak | One peak | Two peaks |
| Coefficient of distribution*1 |  | 5.6 | 14.2 | 6.8 | 7.7 | 6.8 | 4.5 | 14.3 | 17.5 | 15.0 |
| Rubber-like polymer (I)*2 | wt % | 100 | 30 | 70 | 70 | 70 | 70 | 70 | 70 | 90 |
| Rubber-like polymer (III) |  | 0 | 70 | 30 | 30 | 30 | 30 | 30 | 30 | 10 |
| Average particle size of particles having capsule particle morphology | μm | 0.35 | 0.57 | 0.42 | 0.42 | 0.38 | 0.26 | 0.62 | 0.58 | 0.4 |
| Average particle size of particles having cell or coil particle morphology | μm | — | 1.33 | 1.24 | 1.28 | 1.22 | 1.17 | 1.82 | 1.63 | 5.0 |
| Gigantic particles |  | Absent | Absent | Absent | Absent | Absent | Absent | Present | Present | Absent |
| Stick-like particles |  | Absent | Absent | Absent | Absent | Absent | Present | Absent | Absent | Absent |
| Evaluation of Physical Properties | | | | | | | | | | |
| Izod impact strength (notched, thickness = 6.4 mm) | kgcm/cm | 3.5 | 12.5 | 12.4 | 12.6 | 13.7 | 4.8 | 9.5 | 11.5 | 13.0 |
| Practical impact strength | | | | | | | | | | |
| Position (1) | kg · cm | 15 | 55 | 55 | 55 | 58 | 17 | 41 | 48 | 55 |
| Position (2) | kg · cm | 19 | 58 | 58 | 58 | 63 | 19 | 45 | 50 | 58 |
| Position (3) | kg · cm | 35 | 84 | 84 | 84 | 89 | 40 | 69 | 78 | 84 |
| Gloss | | | | | | | | | | |
| Position (1) | % | 94 | 79 | 85 | 85 | 86 | 69 | 63 | 65 | 66 |
| Position (2) | % | 96 | 83 | 89 | 88 | 90 | 70 | 70 | 69 | 70 |
| Position (3) | % | 99 | 89 | 92 | 89 | 93 | 81 | 80 | 80 | 88 |

*1: A ratio of a 5% value to a 95% value of the cumulative distribution of the particle size on the basis of the volume of the rubber-like polymer particles.
*2: The total of the rubber-like polymers was regarded as 100% by weight.

EXAMPLE 17

A rubber modified styrenic resin composition was prepared by the use of a continuous mass polymerization device comprising three serial reactors equipped with stirrers, a preheater and a vacuum chamber at the outlet of the reactors. A material solution comprising 4.0 parts by weight of a styrene-butadiene block copolymer having a styrene content of 42 wt % and a 5 wt % styrene solution viscosity of 32 centipoise as a rubber-like polymer (I), 1.7 parts by weight of a styrene-butadiene block copolymer having a styrene content of 15 wt % and a 5 wt % styrene solution viscosity of 30 centipoise as a rubber-like polymer (IV), 0.3 part by weight of a polybutadiene having a 5 wt % styrene solution viscosity of 45 centipoise as a rubber-like polymer (V), 15 parts of ethylbenzene, 79 parts of styrene, and 0.005 part by weight of 1,1-bis(t-butylperoxy)- 3,3,5-trimethylcyclohexane as an organic peroxide was continuously fed to the first reactor equipped with the stirrer. In the first reactor, the stirring velocity of the stirrer was 300 rpm (Fr=0.459), reaction temperature was 142° C., and residence time was 1.5 hours. In the second reactor, the reaction temperature was 145° C., and the residence time was 2 hours. In the third reactor, the reaction temperature was 145° C., and the residence time was 2.5 hours. The temperature of the preheater was maintained at 210°–240° C. and the vacuum degree in the vacuum chamber was set to 40 Torr. The results are shown in Tables 5 and 6.

EXAMPLE 18

A rubber modified styrenic resin composition was prepared under the same conditions as in Example 17 except that stirring velocity in the first reactor was 200 rpm (Fr= 0.204).

EXAMPLE 19

A rubber modified styrenic resin composition was prepared under the same conditions as in Example 17 except that stirring velocity in the first reactor was 400 rpm (Fr= 0.816).

COMPARATIVE EXAMPLE 22

A rubber modified styrenic resin composition was prepared under the same conditions as in Example 17 except that stirring velocity in the first reactor was 100 rpm (Fr= 0.051). An average particle size of rubber-like polymer particles in the obtained product was large, 1.05 μm, and gloss was low.

COMPARATIVE EXAMPLE 23

A rubber modified styrenic resin composition was prepared under the same conditions as in Example 17 except that stirring velocity in the first reactor was 550 rpm (Fr= 1.543). An average particle size of rubber-like polymer particles in the obtained product was small, 0.16 μm, and impact strength was low.

COMPARATIVE EXAMPLE 24

A rubber modified styrenic resin composition (G) having an average rubber-like polymer particle size of 0.35 μm and a capsule particle morphology was prepared under the same conditions as in Example 17 except that the amount of a rubber-like polymer (I) was 6 parts by weight and any rubber-like polymers (IV) and (V) were not used. Separately, another rubber modified styrenic resin (H) having a large average rubber-like polymer particle size of 1.15 μm and a cell or coil particle morphology was prepared under the same conditions as in Example 17 except that rubber-like polymers (I) and (IV) were not used and 6 parts by weight of a polybutadiene having a 5 wt % styrene solution viscosity of 50 centipoise as the rubber-like polymer (V). The rubber-modified styrenic resins (G) and (H) were mixed in a weight ratio of 85/15, and the mixture was then melted and kneaded by an extruder to obtain a product. The particle size distribution of the thus obtained rubber-like polymer had two peaks, and molded articles obtained therefrom had a large gloss gradient.

COMPARATIVE EXAMPLE 25

A rubber modified styrenic resin composition was prepared under the same conditions as in Example 17 except that residence time in the first reactor was 45 minutes. The obtained product had a large distribution coefficient of 51, and molded articles obtained therefrom had a large gloss gradient.

COMPARATIVE EXAMPLE 26

A rubber modified styrenic resin composition was prepared under the same conditions as in Example 17 except that residence time in the first reactor was 3 hours. The obtained product had a small distribution coefficient of 2.6, and impact resistance was low.

EXAMPLE 20

A rubber modified styrenic resin composition was prepared under the same conditions as in Example 17 except that 4.05 parts by weight of a rubber-like polymer (I), 0.45 part by weight of a rubber-like polymer (IV) and 1.5 parts by weight of a rubber-like polymer (V) were used.

EXAMPLE 21

A rubber modified styrenic resin composition was prepared under the same conditions as in Example 17 except that 2.65 parts by weight of a rubber-like polymer (I), 3.23 parts by weight of a rubber-like polymer (IV) and 0.12 part by weight of a rubber-like polymer (V) were used.

COMPARATIVE EXAMPLE 27

A rubber modified styrenic resin composition (G) prepared in Comparative Example 24 was molded as it was, and physical properties were then evaluated. Gloss was high, but impact resistance was low.

COMPARATIVE EXAMPLE 28

A rubber modified styrenic resin composition was prepared under the same conditions as in Example 17 except that 1.78 parts by weight of a rubber-like polymer (I), 4.16 parts by weight of a rubber-like polymer (IV) and 0.06 part by weight of a rubber-like polymer (V) were used. Gloss was low.

EXAMPLE 22

A rubber modified styrenic resin composition was prepared under the same conditions as in Example 17 except that reaction temperature was 138° C. The conversion of a styrene monomer in the first reactor was 34%.

EXAMPLE 23

A rubber modified styrenic resin composition was prepared under the same conditions as in Example 17 except that reaction temperature was 148° C. The conversion of a styrene monomer in the first reactor was 43%.

EXAMPLE 24

A rubber modified styrenic resin composition was prepared under the same conditions as in Example 17 except that reaction temperature was 144° C. and any organic peroxide was not used.

COMPARATIVE EXAMPLE 29

A rubber modified styrenic resin composition was prepared under the same conditions as in Example 17 except that reaction temperature was 134° C. The conversion of a styrene monomer in the first reactor was 30%. According to the observation of the obtained product in an electron microscope photograph, particles like sticks were seen, and gloss and impact strength were low.

COMPARATIVE EXAMPLE 30

A rubber modified styrenic resin composition was prepared under the same conditions as in Example 17 except that reaction temperature was 152° C. The conversion of a styrene monomer in the first reactor was 48%. According to the observation of the obtained product in an electron microscope photograph, gigantic particles were present, and gloss was low.

COMPARATIVE EXAMPLE 31

A rubber modified styrenic resin composition was prepared under the same conditions as in Example 17 except that reaction temperature was 139° C. and 0.01 part by weight of an organic peroxide was used. The conversion of a styrene monomer in the first reactor was 40%. According to the observation of the obtained product in an electron microscope photograph, gigantic particles were present, and gloss was low.

TABLE 5

| | | Example | | | Comp. Example | | | | | Example | |
|---|---|---|---|---|---|---|---|---|---|---|---|
| | | 17 | 18 | 19 | 22 | 23 | 24 | 25 | 26 | 20 | 21 |
| Conditions of Preparation | | | | | | | | | | | |
| Amount of organic peroxide | pts. wt. | 0.005 | 0.005 | 0.005 | 0.005 | 0.005 | 0.005 | 0.005 | 0.005 | 0.005 | 0.005 |
| Conversion of monomer in reactor for forming particles | % | 39.0 | 39.0 | 39.0 | 39.0 | 39.0 | 39.0 | 39.0 | 39.0 | 39.0 | 39.0 |
| Value of formula (VI) | | 46.8 | 46.8 | 46.8 | 46.8 | 46.8 | 46.8 | 46.8 | 46.8 | 46.8 | 46.8 |
| Structure of Resin | | | | | | | | | | | |
| Volume-average particle size of rubber-like polymer particles | μm | 0.58 | 0.77 | 0.27 | 1.05 | 0.16 | 0.50 | 0.64 | 0.52 | 0.47 | 0.68 |
| Particle size distribution on basis of volume of rubber-like polymer particles | — | One peak | One peak | One peak | One peak | One peak | Two peaks | One peak | One peak | One peak | One peak |
| Coefficient of distribution*1 | | 6.9 | 36.0 | 4.5 | 38.5 | 3.7 | 12.0 | 51.0 | 2.6 | 4.7 | 11.5 |
| Rubber-like polymers (I)/(IV) | wt. ratio | 70/30 | 70/30 | 70/30 | 70/30 | 70/30 | 100/0 | 70/30 | 70/30 | 90/10 | 45/55 |
| Rubber-like polymers [(I) + (IV)]/(V) | | 95/5 | 95/5 | 95/5 | 95/5 | 95/5 | 85/15 | 95/5 | 95/5 | 75/25 | 98/2 |
| Average particle size of particles having capsule particle morphology | μm | 0.36 | 0.57 | 0.16 | 0.79 | 0.12 | 0.35 | 0.42 | 0.33 | 0.31 | 0.47 |
| Average particle size of particles having cell or coil particle morphology | μm | 1.28 | 1.73 | 1.18 | 2.25 | 0.61 | 1.15 | 1.30 | 1.12 | 1.18 | 1.24 |
| Gigantic particles | | Absent | Absent | Absent | Absent | Absent | Absent | Absent | Absent | Absent | Absent |
| Stick-like particles | | Absent | Absent | Absent | Absent | Absent | Absent | Absent | Absent | Absent | Absent |
| Evaluation of Physical Properties | | | | | | | | | | | |
| Izod impact strength (notched, thickness = 6.4 mm) | kgcm/cm | 13.0 | 13.5 | 11.5 | 13.5 | 4.5 | 11.5 | 13.0 | 5.5 | 12.0 | 13.5 |
| Practical impact strength | | | | | | | | | | | |
| Position (1) | kg · cm | 50 | 54 | 47 | 51 | 21 | 47 | 52 | 20 | 45 | 52 |
| Position (2) | kg · cm | 55 | 56 | 49 | 53 | 29 | 48 | 55 | 29 | 49 | 60 |
| Position (3) | kg · cm | 82 | 83 | 80 | 82 | 40 | 79 | 82 | 45 | 80 | 81 |
| Gloss | | | | | | | | | | | |
| Position (1) | % | 90 | 90 | 91 | 49 | 91 | 71 | 65 | 91 | 91 | 90 |
| Position (2) | % | 94 | 92 | 96 | 55 | 95 | 75 | 68 | 93 | 96 | 94 |
| Position (3) | % | 97 | 95 | 98 | 59 | 99 | 98 | 95 | 97 | 99 | 96 |

*1: A ratio of a 5% value to a 95% value of the cumulative distribution of the particle size on the basis of the volume of the rubber-like polymer particles.

TABLE 6

| | | Comp. Example | | Example | | | Comparative Example | | |
|---|---|---|---|---|---|---|---|---|---|
| | | 27 | 28 | 22 | 23 | 24 | 29 | 30 | 31 |
| Conditions of Preparation | | | | | | | | | |
| Amount of organic peroxide | pts. wt. | 0.005 | 0.005 | 0.005 | 0.005 | 0 | 0.005 | 0.005 | 0.01 |
| Conversion of monomer in reactor for forming particles | % | 39.0 | 39.0 | 34.0 | 43.0 | 40.0 | 30.0 | 48.0 | 40.0 |
| Value of formula (VI) | | 46.8 | 46.8 | 42.8 | 50.0 | 47.6 | 39.7 | 53.9 | 47.6 |
| Structure of Resin | | | | | | | | | |
| Volume-average particle size of rubber-like polymer particles | μm | 0.35 | 0.76 | 0.63 | 0.67 | 0.56 | 0.43 | 0.77 | 0.73 |
| Particle size distribution on basis of volume of rubber-like polymer particles | — | One peak | One peak | One peak | One peak | One peak | One peak | One peak | One peak |
| Coefficient of distribution*1 | | 5.6 | 15.8 | 7.8 | 8.9 | 6.7 | 4.5 | 16.2 | 19.5 |
| Rubber-like polymers (I)/(IV) | wt. ratio | 100/0 | 30/70 | 70/30 | 70/30 | 70/30 | 70/30 | 70/30 | 70/30 |
| Rubber-like polymers [(I) + (IV)]/(V) | | 100/0 | 99/1 | 95/5 | 95/5 | 95/5 | 95/5 | 95/5 | 95/5 |
| Average particle size of particles having capsule particle morphology | μm | 0.35 | 0.56 | 0.42 | 0.42 | 0.36 | 0.28 | 0.63 | 0.59 |
| Average particle size of particles having cell or coil particle morphology | μm | — | 1.31 | 1.25 | 1.27 | 1.22 | 1.18 | 1.81 | 1.62 |
| Gigantic particles | | Absent | Absent | Absent | Absent | Absent | Absent | Present | Present |
| Stick-like particles | | | Absent | Absent | Absent | Absent | Absent | Present | Absent | Absent |

TABLE 6-continued

|  |  | Comp. Example | | Example | | | Comparative Example | | |
| --- | --- | --- | --- | --- | --- | --- | --- | --- | --- |
|  |  | 27 | 28 | 22 | 23 | 24 | 29 | 30 | 31 |
| Evaluation of Physical Properties | | | | | | | | | |
| Izod impact strength (notched, thickness = 6.4 mm) | kgcm/cm | 3.5 | 14.0 | 12.0 | 12.0 | 13.0 | 4.5 | 10.5 | 12.0 |
| Practical impact strength | | | | | | | | | |
| Position (1) | kg · cm | 15 | 57 | 51 | 52 | 53 | 19 | 45 | 45 |
| Position (2) | kg · cm | 19 | 59 | 55 | 54 | 60 | 23 | 49 | 46 |
| Position (3) | kg · cm | 35 | 83 | 83 | 81 | 86 | 45 | 75 | 77 |
| Gloss | | | | | | | | | |
| Position (1) | % | 94 | 79 | 90 | 89 | 91 | 67 | 60 | 64 |
| Position (2) | % | 96 | 82 | 94 | 93 | 95 | 70 | 65 | 68 |
| Position (3) | % | 99 | 88 | 97 | 94 | 98 | 80 | 78 | 79 |

*1: A ratio of a 5% value to a 95% value of the cumulative distribution of the particle size on the basis of the volume of the rubber-like polymer particles.

What is claimed is:

1. A rubber modified styrenic resin composition obtained by dispersing rubbery polymer particles in a homopolymer or a copolymer of a styrenic monomer wherein said rubber modified styrenic resin composition has:

(a) a volume-average particle size of the rubbery polymer particles in the range of from 0.2 to 0.8 μm, (b) a particle size distribution curve on the basis of the volume of the rubbery polymer particles having one peak, (c) a ratio of a 5% value to a 95% value of the cumulative distribution of the particle size on the basis of the volume of the rubbery polymer particles in the range of from 3 to 45, said rubbery polymer particles comprising particles having a cell or coil particle morphology and particles having a capsule particle morphology wherein a volume-average particle size of the particles having the cell or coil particle morphology is from 0.3 to 2.0 μm, a volume-average particle size of the particles having the capsule particle morphology is from 0.1 to 1.0 μm, a ratio of the number of the particles having the capsule particle morphology to the number of the total particles is from 30 to 99%, and a ratio of the number of the particles having the cell or coil particle morphology to the number of the total particles is from 70 to 1%, and wherein the rubbery polymer of the rubbery polymer particles comprises:

(i) a styrene-butadiene block copolymer (I) having a 5% by weight styrene solution viscosity of 20–50 centipoise and a styrene content of 25–50% by weight, and (ii)
   (1) a styrene-butadiene block copolymer (II) having a 5% by weight styrene solution viscosity of 20–50 centipoise and a styrene content of 5–20% by weight wherein the weight ratio of the styrene-butadiene block copolymer (I) to the styrene-butadiene block copolymer (II) is from 95/5 to 40/60, or (2) a polybutadiene (III) having a 5% by weight styrene solution viscosity of 20–100 centipoise wherein the weight ratio of the styrene-butadiene block copolymer (I) to the polybutadiene (III) is from 95/5 to 40/60, or (3) a styrene-butadiene block copolymer (IV) having a 5% by weight styrene solution viscosity of 20–50 centipoise and a styrene content of 5–20% by weight, and a polybutadiene (V) having a 5% by weight styrene solution viscosity of 30–90 centipoise wherein the weight ratio (I)/(IV) of (I) to (IV) is 95/5 to 40/60, and the weight ratio [(I)+(IV)]/(V) of the sum of (I) and (IV) to (V) is from 99/1 to 70/30.

2. The rubber modified styrenic resin composition according to claim 1 wherein the weight ratio of the rubbery polymer to the styrenic homopolymer or copolymer is from 3/97 to 25/75.

3. The rubber modified styrenic resin composition according to claim 1 wherein said rubbery polymer which is a formation material of the rubbery polymer particles comprises (i) a styrene-butadiene block copolymer (I) having a 5% by weight styrene solution viscosity of 20–50 centipoise and a styrene content of 25–50% by weight, and (ii) a styrene-butadiene block copolymer (II) having a 5% by weight styrene solution viscosity of 20–50 centipoise and a styrene content of 5–20% by weight (a weight ratio of the styrene-butadiene block copolymer (I) to the styrene-butadiene block copolymer (II) is from 95/5 to 40/60).

4. The rubber modified styrenic resin composition according to claim 1 wherein said rubbery polymer which is a formation material of the rubbery polymer particles comprises (i) a styrene-butadiene block copolymer (I) having a 5% by weight styrene solution viscosity of 20–50 centipoise and a styrene content of 25–50% by weight, and (ii) a polybutadiene (III) having a 5% by weight styrene solution viscosity of 20–100 centipoise (a weight ratio of the styrene-butadiene block copolymer (I) to the polybutadiene (III) is from 95/5 to 40/60).

5. The rubber modified styrenic resin composition according to claim 1 wherein said rubbery polymer which is a formation material of the rubbery polymer particles comprises (i) a styrene-butadiene block copolymer (I) having a 5% by weight styrene solution viscosity of 20–50 centipoise and a styrene content of 25–50% by weight, and (ii) a styrene-butadiene block copolymer (IV) having a 5% by weight styrene solution viscosity of 20–50 centipoise and a styrene content of 5–20% by weight, and a polybutadiene (V) having a 5% weight styrene solution viscosity of 30–90 centipoise (a weight ratio (I)/(IV) of (I) to (IV) is 95/5 to 40/60, and a weight ratio [(I)+(IV)]/(V) of the sum of (I) and (IV) to (V) is from 99/1 to 70/30).

6. The rubber modified styrenic resin composition according to claim 1 wherein said styrenic monomer is styrene, α-methylstyrene, p-methylstyrene or a mixture thereof.

* * * * *

UNITED STATES PATENT AND TRADEMARK OFFICE
CERTIFICATE OF CORRECTION

PATENT NO. : 5,473,014

DATED: : December 5, 1995

INVENTOR(S) : Toshihiko ANDO et al

It is certified that error appears in the above-identified patent and that said Letters Patent is hereby corrected as shown below:

On title page, item [22] should read as follows:

[22] Filed: March 18, 1993

Signed and Sealed this

Ninth Day of July, 1996

Attest:

BRUCE LEHMAN

Attesting Officer     Commissioner of Patents and Trademarks